(12) United States Patent
Chen et al.

(10) Patent No.: US 11,991,581 B2
(45) Date of Patent: May 21, 2024

(54) METHODS AND APPARATUS FOR MULTI-SHOT NETWORK PARAMETER OPTIMIZATION

(71) Applicant: Samsung Electronics Co., Ltd., Suwon-si (KR)

(72) Inventors: Hao Chen, Allen, TX (US); Lianjun Li, McKinney, TX (US); Zhou Zhou, Allen, TX (US); Yan Xin, Princeton, NJ (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 17/384,676

(22) Filed: Jul. 23, 2021

(65) Prior Publication Data

US 2022/0046506 A1 Feb. 10, 2022

Related U.S. Application Data

(60) Provisional application No. 63/062,070, filed on Aug. 6, 2020.

(51) Int. Cl.
*H04W 24/00* (2009.01)
*H04W 24/02* (2009.01)
(Continued)

(52) U.S. Cl.
CPC ......... *H04W 36/165* (2013.01); *H04W 24/02* (2013.01); *H04W 36/00837* (2018.08)

(58) Field of Classification Search
CPC .............. H04W 36/165; H04W 24/02; H04W 36/00837; H04W 36/0083
(Continued)

(56) References Cited

U.S. PATENT DOCUMENTS 10,798,626 B2   10/2020   Ronen et al.
2014/0200004 A1  7/2014   Wegmann et al.
(Continued)

FOREIGN PATENT DOCUMENTS

KR   10-2016-0100328 A   8/2016

OTHER PUBLICATIONS

International Search Report and Written Opinion dated Nov. 8, 2021 regarding International Application No. PCT/KR2021/010371, 7 pages.
(Continued)

*Primary Examiner* — Marcos Batista

(57) ABSTRACT

A system and method of a base station are configured to enable a multi-shot network parameter optimization. The method includes generating one or more specified Key Performance Indicators (KPI) constraints based on a selected set of KPIs. The method also includes adjusting common beam parameters to tune a common beam based on the selected set of KPIs. The common beam is tuned to satisfy the one or more specified KPI constraints. The method also includes adjusting handover A2 and A5 parameters based on searching within a three-dimensional space defined by specified A2 and A5 thresholds. The method further includes transmitting one or more signals based on the adjusted the common beam parameters and the adjusted handover A2 and A5 parameters.

20 Claims, 13 Drawing Sheets

(51) Int. Cl.
*H04W 36/00* (2009.01)
*H04W 36/16* (2009.01)

(58) Field of Classification Search
USPC .......................................... 455/436; 370/338
See application file for complete search history.

(56) References Cited

U.S. PATENT DOCUMENTS

| | | |
|---|---|---|
| 2015/0173011 A1 | 6/2015 | Das et al. |
| 2016/0087842 A1* | 3/2016 | Tang ..................... H04W 24/02 |
| | | 455/67.11 |
| 2017/0013475 A1 | 1/2017 | Lioliou et al. |
| 2018/0332475 A1 | 11/2018 | Nilsson et al. |
| 2020/0204439 A1 | 6/2020 | Scott |
| 2021/0014820 A1 | 1/2021 | Bodduru et al. |

OTHER PUBLICATIONS

Gomez-Andrades et al., "Methodology for the Design and Evaluation of Self-Healing LTE Networks", IEEE Transactions on Vehicular Technology, vol. 65, No. 8, Aug. 2016, pp. 6468-6486.
Shodamola et al., "A Machine Learning based Framework for KPI Maximization in Emerging Networks using Mobility Parameters", arXiv:2005.01474v1 [cs.NI], May 2020, 6 pages.
Cascino et al., "Design of optimized mobility capabilities in future 5G systems", Aalborg University, Department of Electronic Systems, Master Thesis, Group 1053, Jun. 2015, 97 pages.

* cited by examiner

First search 4 boundaries, select the best 3.

Search the centroid of the triangle, select the best 3 among 4

Search the centroid of the triangle, select the best 3 among 4

First search 4 boundaries, select the best 3.

Search along the direction defined by the centroid and the worst vertex.

METHODS AND APPARATUS FOR MULTI-SHOT NETWORK PARAMETER OPTIMIZATION

CROSS-REFERENCE TO RELATED APPLICATIONS AND CLAIM OF PRIORITY

The present application claims priority to U.S. Provisional Patent Application No. 63/062,070 filed on Aug. 6, 2020. The content of the above-identified patent document is incorporated herein by reference.

TECHNICAL FIELD

The present disclosure relates to electronic devices and methods for network parameter optimization, more particularly, to electronic devices and methods for common beam optimization and handover parameter optimization.

BACKGROUND

In the current communication system, network parameter optimization especially the RF parameter optimization such as common beam and handover parameters are key to improve the network performance. However, most the existing optimizations methods need additional information such as UE locations, 3-dimensional (3D) maps or Sounding reference signals (SRS) to assist a base station, or enhanced node-B (eNB) to estimate the performance of changing network parameters. These additional changes may cause implementation complexity and also may not be directly applied to exiting eNBs.

SUMMARY

Embodiments of the present disclosure provide methods and apparatuses for full power UL MIMO operation in an advanced wireless communication system.

In one embodiment, a method is provided. The method includes generating one or more specified Key Performance Indicators (KPI) constraints based on a selected set of KPIs. The method also includes adjusting common beam parameters to tune a common beam based on the selected set of KPIs. The common beam is tuned to satisfy the one or more specified KPI constraints. The method also includes adjusting handover A2 and A5 parameters based on searching within a three-dimensional space defined by specified A2 and A5 thresholds. The method further includes transmitting one or more signals based on the adjusted the common beam parameters and the adjusted handover A2 and A5 parameters.

In one embodiment, an apparatus is provided. The apparatus includes a transceiver configured to communicate via a wireless communication medium. The apparatus also includes processor is configured to: generate one or more specified Key Performance Indicators (KPI) constraints based on a selected set of KPIs; adjust common beam parameters to tune a common beam based on the selected set of KPIs, wherein the common beam is tuned to satisfy the one or more specified KPI constraints; adjust handover A2 and A5 parameters based on searching within a three-dimensional space defined by specified A2 and A5 thresholds; and transmit one or more signals based on the adjusted the common beam parameters and the adjusted handover A2 and A5 parameters.

In another embodiment, a computer readable medium is provided. The computer readable medium includes instructions that, when executed by a processor, cause the processor to: generate one or more specified Key Performance Indicators (KPI) constraints based on a selected set of KPIs; adjust common beam parameters to tune a common beam based on the selected set of KPIs, wherein the common beam is tuned to satisfy the one or more specified KPI constraints; adjust handover A2 and A5 parameters based on searching within a three-dimensional space defined by specified A2 and A5 thresholds; and transmit one or more signals based on the adjusted the common beam parameters and the adjusted handover A2 and A5 parameters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
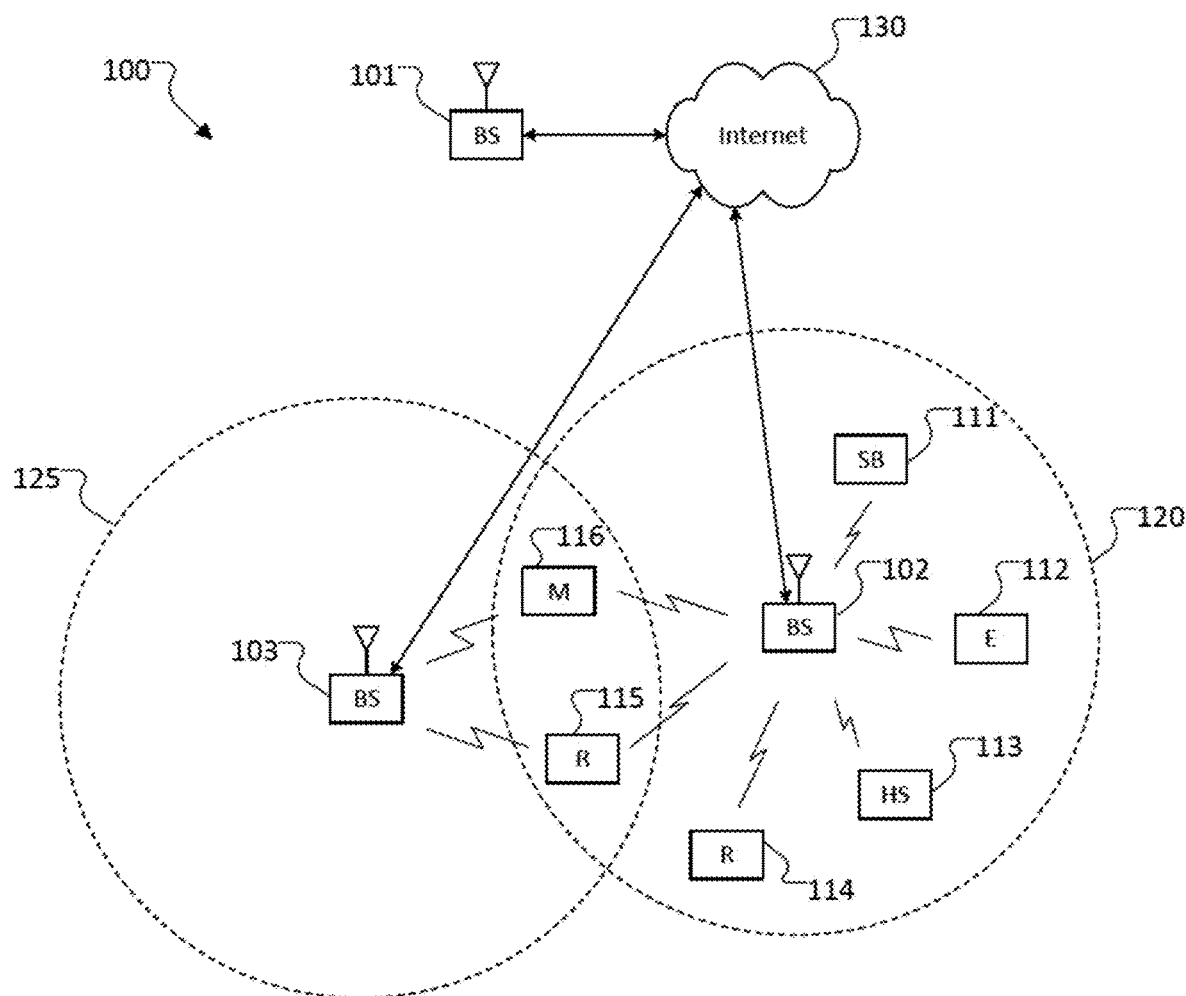
FIG. 1 illustrates an example wireless network according to embodiments of the present disclosure.

FIG. 1 through FIG. 16E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Embodiments of the present disclosure directly use Key Performance Indicator (KPI) measurements at an enhanced Node-B (eNB) side to optimize the performance of cellular network. Certain embodiments, referenced as multi-shot optimization, provide for common beam optimization and handover parameter optimization.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

In this disclosure, the term 'shared spectrum' is used in an inclusive manner without the distinction on the shared spectrum and unlicensed spectrum and it also includes not only the currently available spectrums but also spectrums that will be made available in the future. Thus, the term 'shared spectrum' should not be interpreted as a limiting factor in determining the scope of the present disclosure.

Figure 2:
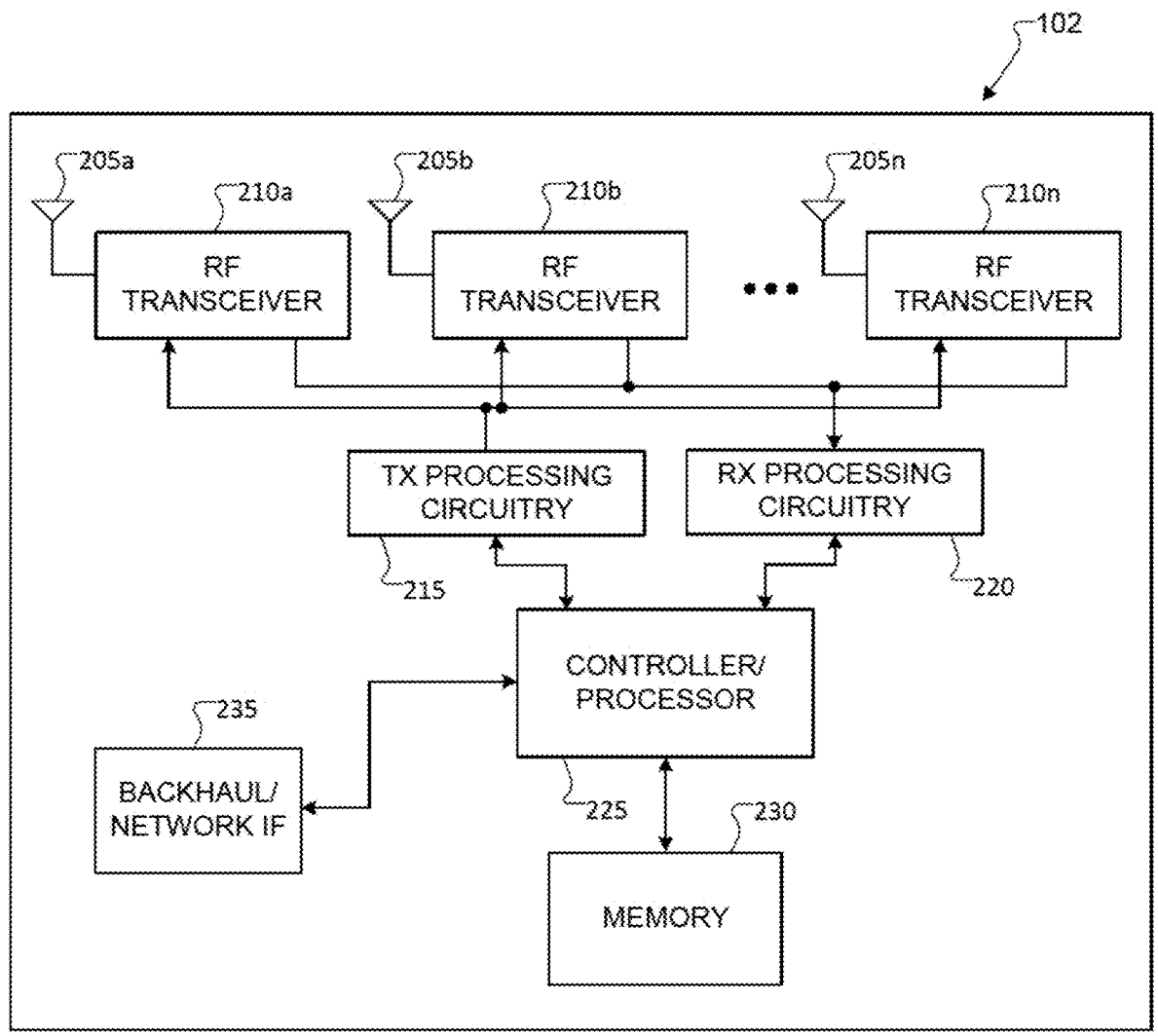
FIG. 2 illustrates an example base station according to embodiments of the present disclosure.
Figure 3:
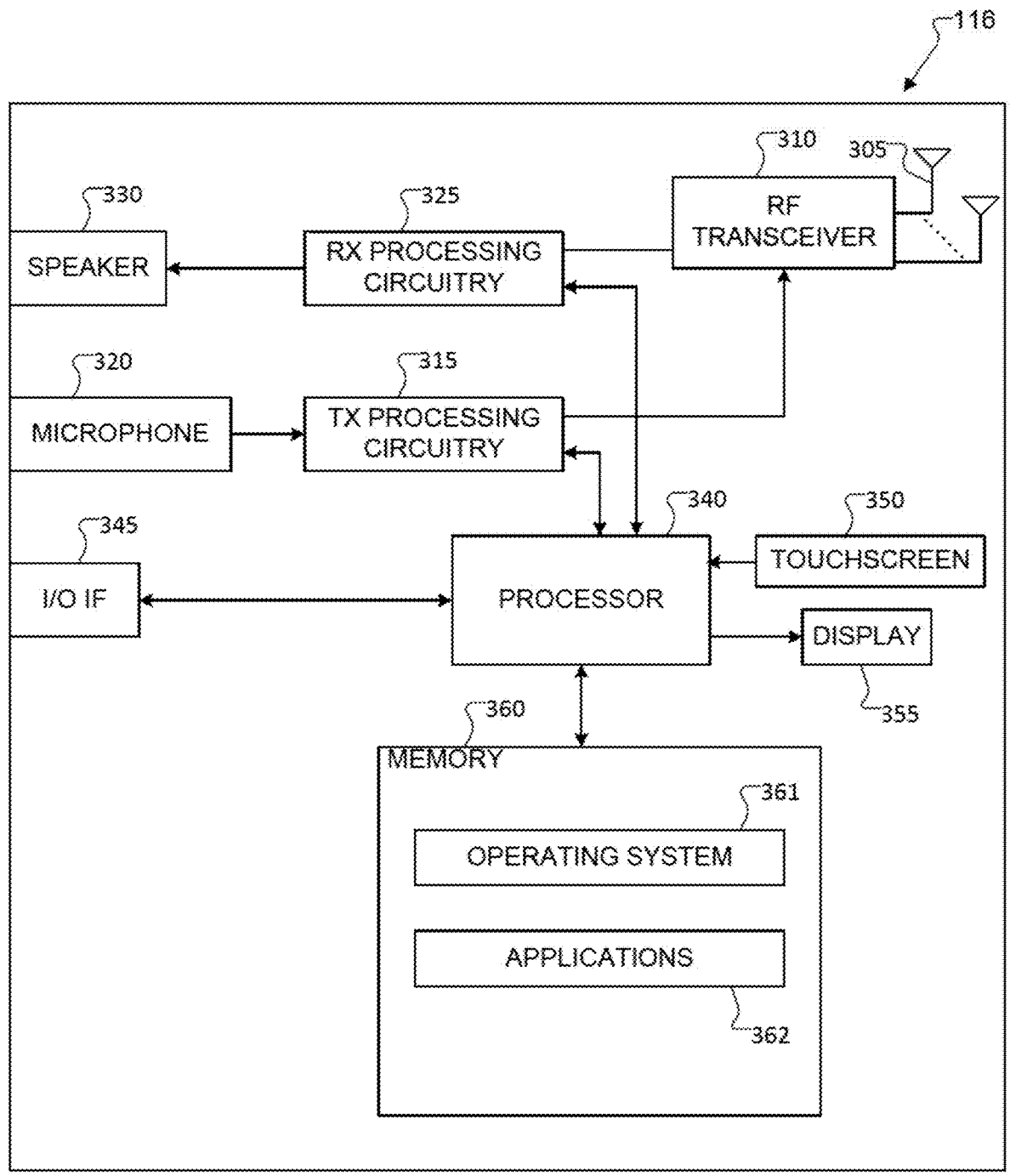
FIG. 3 illustrates an example user equipment according to embodiments of the present disclosure.

FIGS. 1-4B below describe various embodiments implemented in wireless communications systems and with the use of orthogonal frequency division multiplexing (OFDM)

or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 include circuitry, programing, or a combination thereof, for receiving, via the transceiver, configuration information including one or more of: SSB frequency, SSB subcarrier spacing, CSI-RS frequency, or physical cell ID, measure, via the transceiver, an interference or serving cell signal qualities according to the configuration information, compute a first change in an interference level for a neighboring BS sharing a spectrum with a serving BS, and in response the first change exceeding a first threshold, perform measurement reporting of the measured signal qualities. In certain embodiments, and one or more of the gNBs 101-103 includes circuitry, programing, or a combination thereof, to transmit, via the transceiver, configuration information including one or more of: SSB frequency, SSB subcarrier spacing, CSI-RS frequency, or physical cell ID, an interference or serving cell signal qualities are measured according to the configuration information and a first change in an interference level for a neighboring base station (BS) sharing a spectrum with the BS is computed, and in response the first change exceeding a first threshold, receive a measurement report of the measured signal qualities.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver. The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller. The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
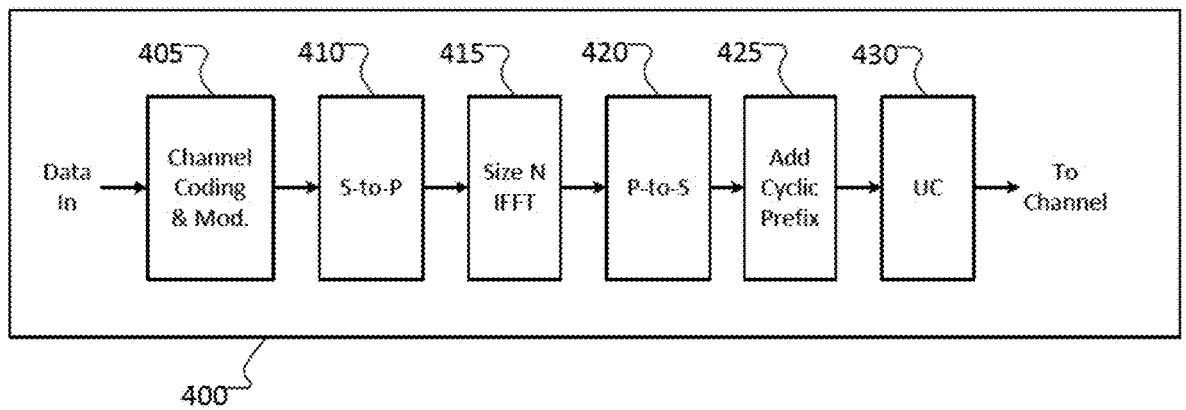
FIG. 4A illustrates a high-level diagram of an orthogonal frequency division multiple access transmit path according to embodiments of the present disclosure.
Figure 4B:
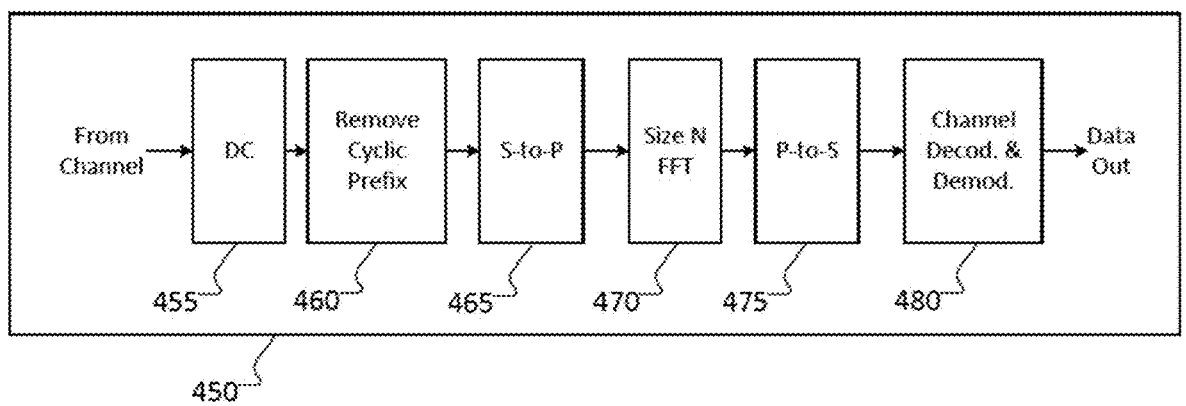
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry may be used for an orthogonal frequency division multiple access (OFDMA) communication. FIG. 4B is a high-level diagram of receive path circuitry 450. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in transmit path circuitry 400 and receive path circuitry 450 in FIGS. 4A and 4B, may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
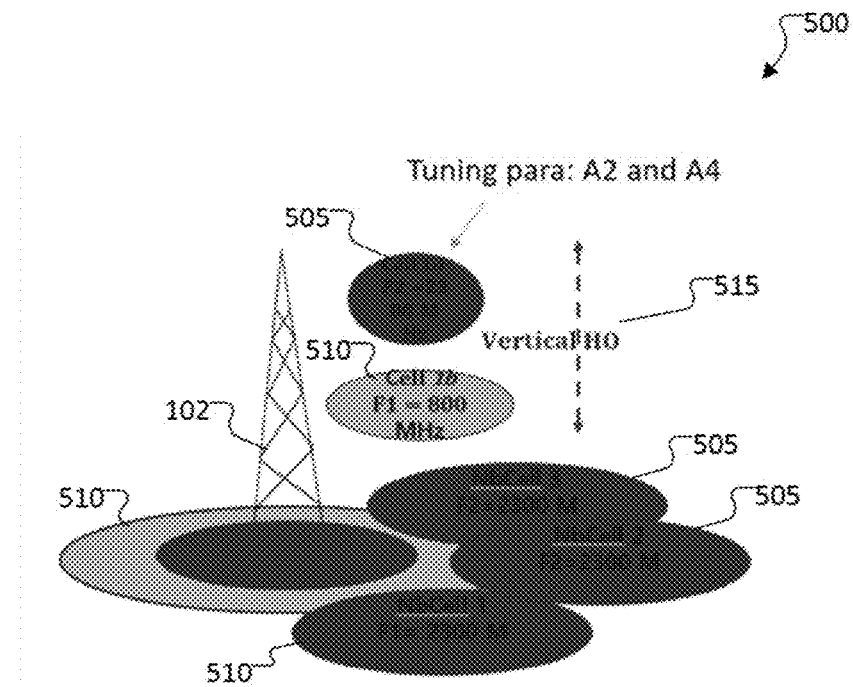
FIGS. 5 and 6 illustrates multi-band load balancing with A2 and A5 thresholds according to embodiments of the present disclosure.
Figure 6:
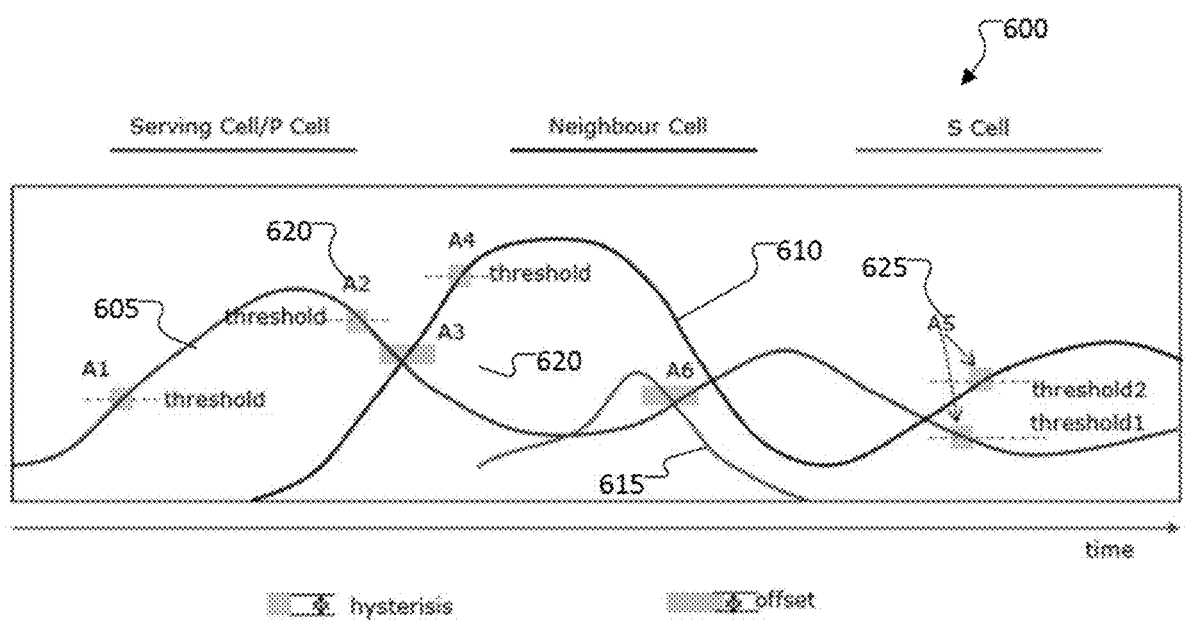

FIGS. 5 and 6 illustrates multi-band load balancing with A2 and A5 thresholds according to embodiments of the present disclosure. The embodiment of the cellular bands 100 illustrated in FIG. 5 and the example 600 A2 and A5 events illustrated in FIG. 6 are for illustration only. Other embodiments could be used without departing from the scope of the present disclosure.

In the example shown in FIG. 5, gNB 102 is configured to transmit signals through different bands in different cells. For example, a first cell 505 can be 2.3 Giga-hertz (GHz) while another cell 510 can be 800 Mega-hertz (MHz) can be associated with a same network 500. Additionally, in the example shown in FIG. 6, a measured Reference Signal Received Power (RSRP) value 605 for the first cell 505; a measured RSRP value 610 for the second cell 510; and a measured RSRP value 615 for an S cell are depicted.

Handover is one of the procedures that will affect the network performance. A good handover will make sure the user device has smooth quality of service. A bad handover can lead to cell performance degradation, such as radio link failure and throughput degradation. An inter-frequency handover, for which the handover is decided by the A2 andA5 events.

In certain embodiments, gNB 102 is configured to optimize two sets of network parameters including a mobility parameter, which is the A2 and A5 thresholds. The network parameters are optimized in order to optimize net performance, especially for multiband load balancing. For example, in the wireless network 100, UEs 111-116, are able to communicate on different bands. That is, for example, UE 116 is able to communicate on the first cell 505, at 800 MHz, or on the second cell 510, at 2.3 GHz. As the UE 116 moves, UE 116 can move from one band to another band, that is, move from the first cell 505 to the second cell 510, because each band can have a different coverage and each band also can have a different load. The A2 and A5 threshold are configured to control the band to which UE 116 will be associated. That is, gNB 102 transmits control signals to UE 116 instructing UE 116 regarding which thresholds to use for handover 515. In certain embodiments, initial cell association and access priority is determined according to a comparison between a measured RSRP and a threshold. For example, when RSRP_cla>RSRP_th, UE 116 will connect to the first cell 505; when RSRP_cla<A2_th+H, UE 116 will trigger an A2 event 620 and perform inter-frequency measurement; and when RSRP_nbcell>A5_2th+H, and RSRP_cla<A5_1th+H, UE 116 will trigger an A5 event 625 and start handover 515 to a neighbor cell, such as the second cell 510.

In certain embodiments, the handover 515 is an inter-frequency handover, for which the handover 515 is decided by the A2 event 620 and A5 event 610. A UE will trigger the inter-frequency measurement if the following equation is met:

$$P_i^{t,h} < T_{i,a2}^{t,h} + H_i \quad (1)$$

where: $P_i^{t,h}$ and $P_j^{t,l}$ are the user terminal's RSRP of its serving cell i on band h and the neighbor cell j on band l respectively. $H_i$ is the hysteresis to prevent frequent handovers. $T_{i,a2}^{t,h}$ is the A2 threshold for cell i on band h.

After inter-frequency measurement, UE 116 will obtain, such as via measurement or signaling, the RSRP values from neighbor cells on a different frequency, cell j. If the following two conditions are met, then a handover event will happen:

$$P_i^{t,h} < T_{i,a5,1}^{t,h} + H_i \quad (2)$$

$$P_j^{t,l} < T_{j,a5,2}^{t,l} + H_j \quad (3)$$

Therefore, by controlling the A2 and A5 thresholds, gNB 102 is able to control a time at which UE 116 will perform handover 115 as well as to which cell the UE 116 will handover.

Figure 7:
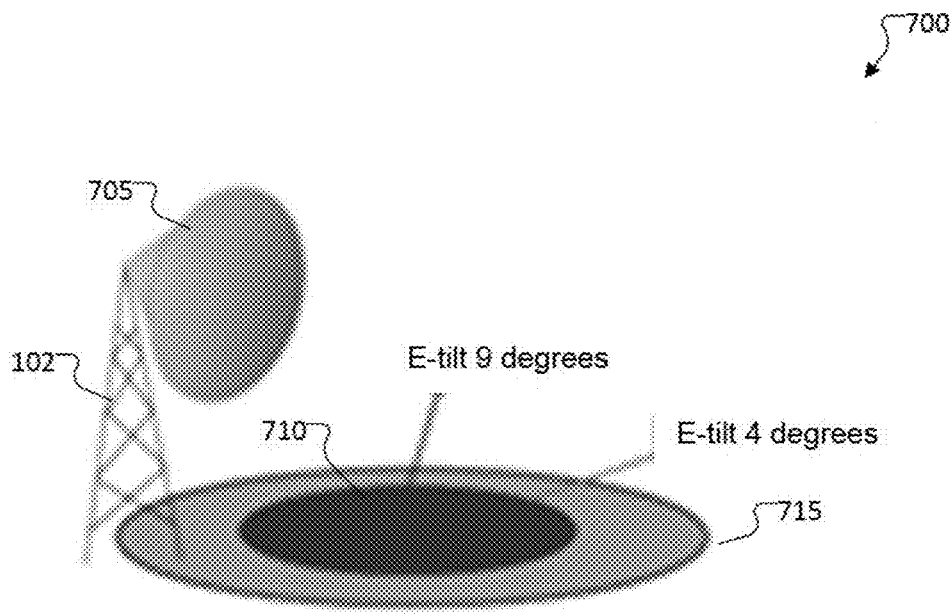
FIG. 7 illustrates example coverage of E-tilt/beam optimization according to embodiments of the present disclosure.

FIG. 7 illustrates example coverage of E-tilt/beam optimization according to embodiments of the present disclosure. The embodiment of the E-tilt/beam optimization 700 shown if for illustration only and other embodiments could be used without departing from the scope of the present disclosure.

In certain embodiments, common beam and E-tilt are additional parameters that can be optimized to improve the cellular performance. Changing the E-tilt or common beam of a cell will change the cellular coverage and further affect the cell performance. For example, when gNB 102 can transmits 705 with an E-tilt set at 9°, gNB 102 is able to cover a first cell area 710. Alternatively, when gNB 102 can transmits 705 with an E-tilt set at 4°, gNB 102 is able to cover a second cell area 715.

Figure 8:
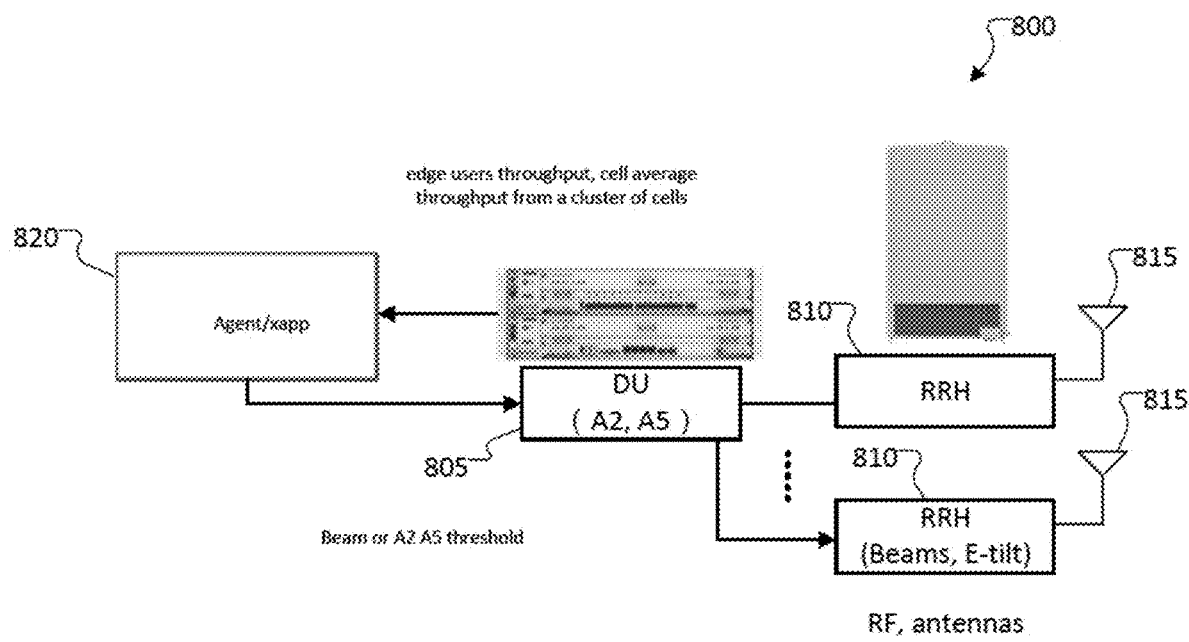
FIG. 8 illustrates example base station according to embodiments of the present disclosure.

FIG. 8 illustrates example base station according to embodiments of the present disclosure. The embodiment of the base station 800 shown if for illustration only and other embodiments could be used without departing from the scope of the present disclosure. The base station 800 shown in FIG. 8 can configured the same as, or similar to, gNB 102 or gNB 103 in FIG. 1.

The base station 800 includes a digital unit (DU) 805, or baseband unit, comprising processors, filters, memory and programming for performing the functions for supporting cellular communications. The base station 800 also includes one or more remote radio heads (RRH) 810, which can include one or more transceivers, transmit paths, and receive paths, such as transmit path 400 and receive path 450 in FIGS. 4A and 4B. Each or the RRH 810 is coupled to a respective antenna 815, which can include one or more antenna elements, and can be configured as an antenna array having one or more antennas. The base station 800 further includes an agent 820.

The base station 800 is configured to perform multi-shot optimization. The agent 820 receives the network key performance indicator (KPI) as input. Then based on the trend of KPI changes, the agent 820 determines a new network parameters to test on common beam and handover parameters and provides these new parameters to the DU 805 to implement through RRH 810 and antenna 815.

In certain embodiments, base station 800 is configured to select and process a set of KPIs that are related to the common beam and handover parameters in order to perform optimization. In certain embodiments, base station 800 is configured to determine a good candidate common beam pattern and tune the common beam in a given time period limit with a limited number of trials based on the KPI, such that the KPI constraint can be met and the cell or cluster of cell performance can be improved. In certain embodiments, base station 800 is configured to adjust the handover parameter A2 and A5 in a given time period limit with a limited number of trials for cell performance optimization.

Figure 9:
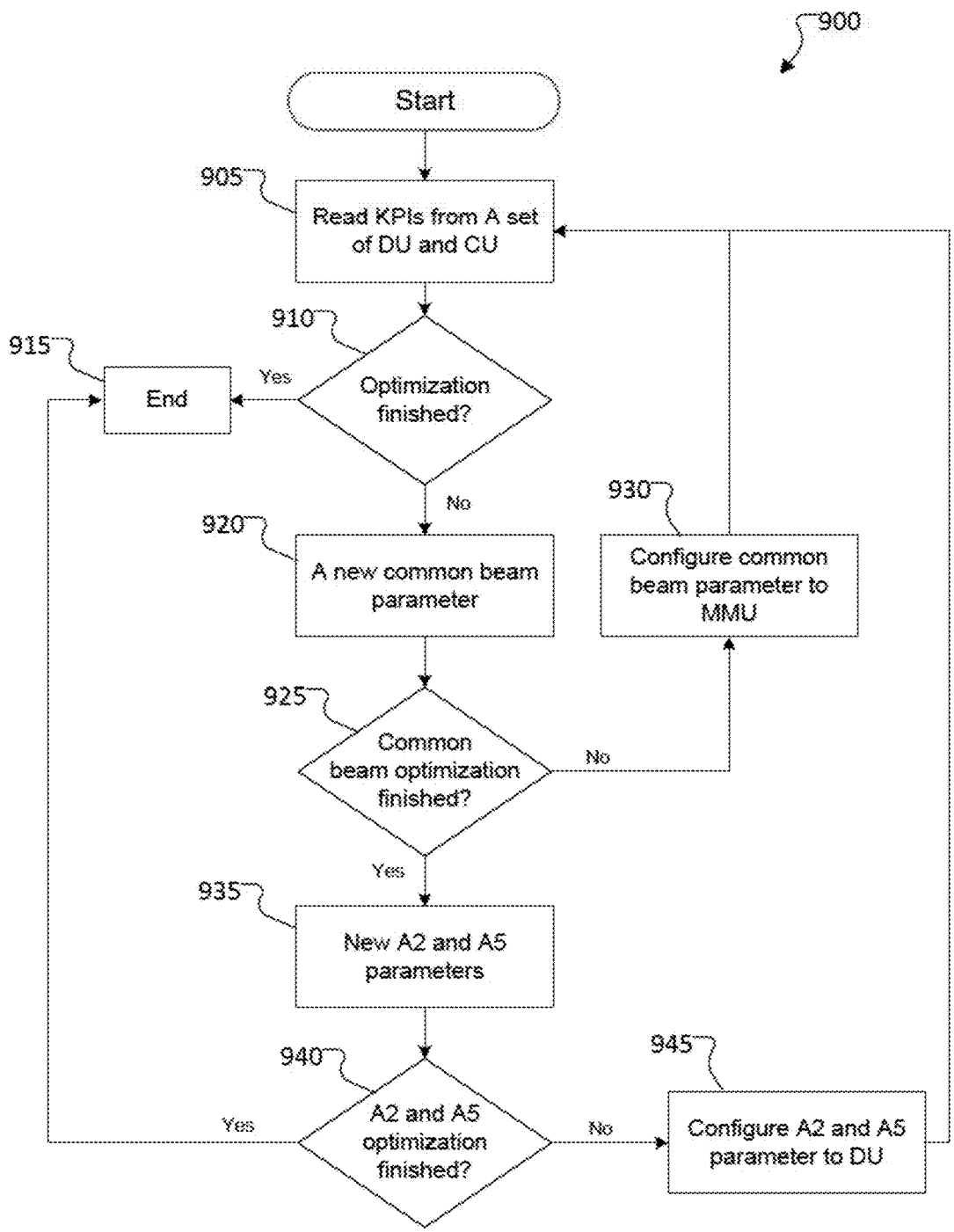
FIG. 9 illustrates a process for multi-shot parameter optimization according to embodiments of the present disclosure.

FIG. 9 illustrates a process for multi-shot parameter optimization according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a gNB. Process 900 can be accomplished by, for example, gNB 102, and gNB 103 in network 100.

At operation 905, gNB 012 obtains KPIs from one or more DUs. That is, gNB 102 can select KPIs and select target DUs and control units (CU). In certain embodiments, the gNB 102 selects a target cell for optimization. Thereafter, gNB 102 checks the neighbor cell list for the target cell. Then, gNB 102 fetches KPIs from this cluster of cells. The gNB 102 is configured to read the KPIs from a set of DUs and CUs. The KPI selected can be one or more of: a number of RRC connected UEs of a cell in a window of time T; cell throughput in a cluster; 50% SINR in the cluster; or an average cell load in the cluster. A DU collects UE reported signal-to-interference plus noise ratio (SINR), and the like. The DU will report a cell's throughput, SINR, load, and number of connected UE's. A cluster size is determined from the target cell's neighbor cell list. The gNB 102 then fetches the reported KPIs from the cluster and calculates an objective function corresponding to one or more generated KPI constraints.

In certain embodiments, for each cell, an optimization agent, such as agent 820 in a gNB 102, can collect KPI information every T minutes. In one example, T could be 15 seconds. Some KPIs include $c_t$, which represents the cell throughput at time t, $r_t$ which represents the number of RRC connected UEs at time t. A cluster of cell S is selected for optimization. The cluster aggregated KPI at time t can be expressed as:

$$R_t(i) = \sum_{s \in S} r_{t,s}(i) \quad (4)$$

$$C_t(i) = \sum_{s \in S} c_{t,s}(i), \quad (5)$$

where $r_{t,s}(i)$, $c_{t,s}(i)$ represent the number of RRC connected UEs and cell throughput for cell s with network parameter i at time t, respectively; $R_t(i)$ and $C_t(i)$ represent the aggregated number of RRC connected UEs and throughput for a cluster of cells under network parameter i. One example of selecting these default values is to use the initial network parameters to get these KPI values.

At operation 910, gNB 012 determines if optimization is finished. The optimization completion may be determined based on a specified requirement, such as to be complete within a time T, a counter value, or the like. If gNB 102 determines that optimization is finished, the process proceeds to completion in operation 915. If gNB 102 determines that optimization is not finished, the process proceeds to operation 920.

At operation 920, gNB 102 determines a new common beam parameter. The gNB 102 will generate a new set of common beam parameters for the target DU. After determining a new common beam parameter, gNB 102 selects the new common beam parameter and preforms common beam optimization. In certain embodiments, one objective of optimizing common beam is to improve the aggregated throughput in the selected cluster of cells. In certain embodiments, one objective of optimizing common beam is to improve the weighted sum of aggregated throughput and aggregated RRC connected UEs as:

$$f(i) = w_1 \frac{R_t(i)}{R_C} + (1 - w_1) \frac{C(i)}{C_C}, \quad (6)$$

where $w_1$ is the weight to balance the throughput and RRC connected UEs, $R_C$ and $C_C$ is the default value to normalize two items. In certain embodiments, gNB 102 is configured to utilize a beam searching method, such as described herein below with respect to FIG. 11.

In operation 925, gNB 102 determines whether common beam optimization is finished. For example, whether common beam optimization is finished can be based on a specified requirement, such as to be complete within a time T, a counter value, or the like. If gNB 102 determines that common beam optimization is not finished, gNB 102 proceeds to configure the common beam parameter to the memory management unit (MMU) in operation 930. If gNB 102 determines that common beam optimization is not finished, gNB 102 proceeds to operation 935.

In operation 935, gNB 102 determines new A2 and A5 parameters. The gNB 102 will generate a new set of A2 and A5 parameters for the target DU. Thereafter, gNB 102 proceeds to determine if A2 and A5 optimization is finished in operation 940. If gNB 102 determines that A2 and A5 optimization is not finished, the process ends in operation 915. If gNB 102 determines that A2 and A5 optimization is not finished, gNB 102 proceeds to configure the A2 and A5 parameters to the DU in operation 945.

In operations 930 and 945, gNB 102 will complete the A2 and A5 parameters to the DU and the common beam parameter to the MMU. The DU will configured its received common beam parameters and A2, A5 parameters. The gNB 102 will wait a time period, such as one day, and re-perform the process by obtaining KPI values in operation 905.

Accordingly, in process 900, beam and (A2, A5) parameters are optimized separately. The gNB 103 then calculates the objective function:

$$f(i) = w_1 \frac{R_i}{R_C} + w_2 \frac{C_i}{C_C} \quad (7)$$

where: $R_i$ denotes 50% SINR for RRC connected UEs in cluster for beam i; $R_C$ denotes 50% SINR for RRC connected UEs in cluster for default beam; $C_i$ denotes Sum of cell aggregated throughput for beam i in cluster; $C_C$ denotes Sum of cell aggregated throughput for default beam in cluster; and $w_1$ and $w_2$ are weighting factors. In certain embodiments, the objective function could be a function of RSRP, Packet error rate and the like.

Figure 10:
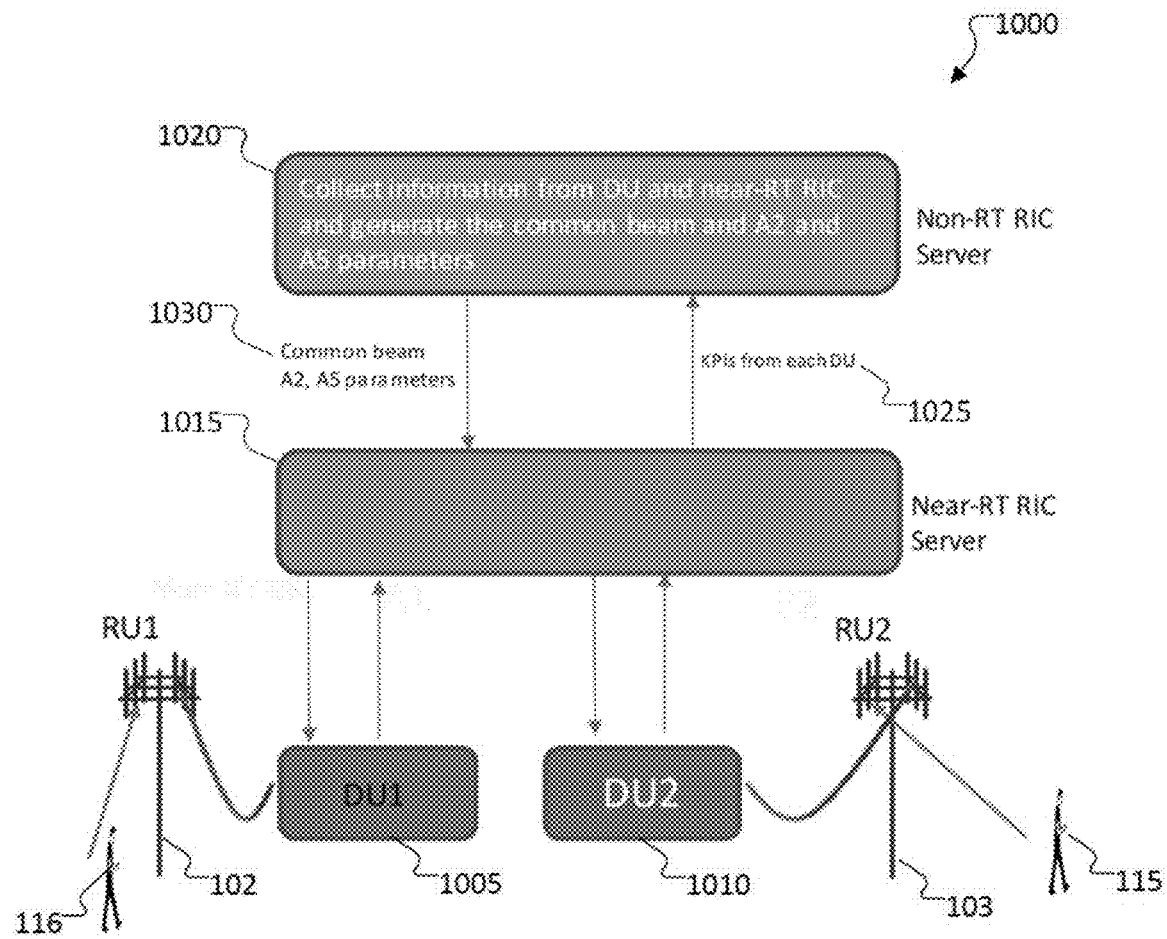
FIG. 10 illustrates an example multi-shot optimization procedure according to embodiments of the present disclosure.

FIG. 10 illustrates an example multi-shot optimization procedure according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a gNB. Process 900 can be accomplished by, for example, gNB 102, and gNB 103 in network 100.

In the example shown in FIG. 10, a first UE 116 is in a cell of, and in communication with, gNB 102, while a second UE 115 is in a cell of, and in communication with, gNB 103. Each gNB includes, or is coupled with, a respective DU. For example, gNB 102 includes DU1 1005 while gNB 103 includes DU2 1010.

A DU will collect UE reported SINR. For example, DU1 1005 can collect reports from UE 116 through gNB 102 and DU2 1010 can collect reports from UE 115 through gNB 103. The reports can include an SINR measured by each UE. The DU1 1005 and DU2 1010 each report their respective cell's throughput, SINR, load, and number of connected UE's to a near real time (RT) radio area network (RAN) intelligent controller (RT RIC) server 1015. The near RT RIC server 1015 reports the measurement information to the non-RT RIC server 1020. The measurement information can include KPIs 1025 from each respective DU. The non-RT RIC server 1020 collects information from the DUs and from the near RT RIC server 1015. The non-RT RIC server 1020 decide the cluster size from the target cell's neighbor cell list. The non-RT RIC server 1020 then fetches the reported KPIs from the cluster and calculates the objective function. The non-RT RIC server 1020 generates a new set of common beam parameters and A2 and A5 parameters for the target DU, such as DU1 1005. Then, DU1 1005 will configure its received common beam parameters and A2, A5 parameters.

Figure 11:
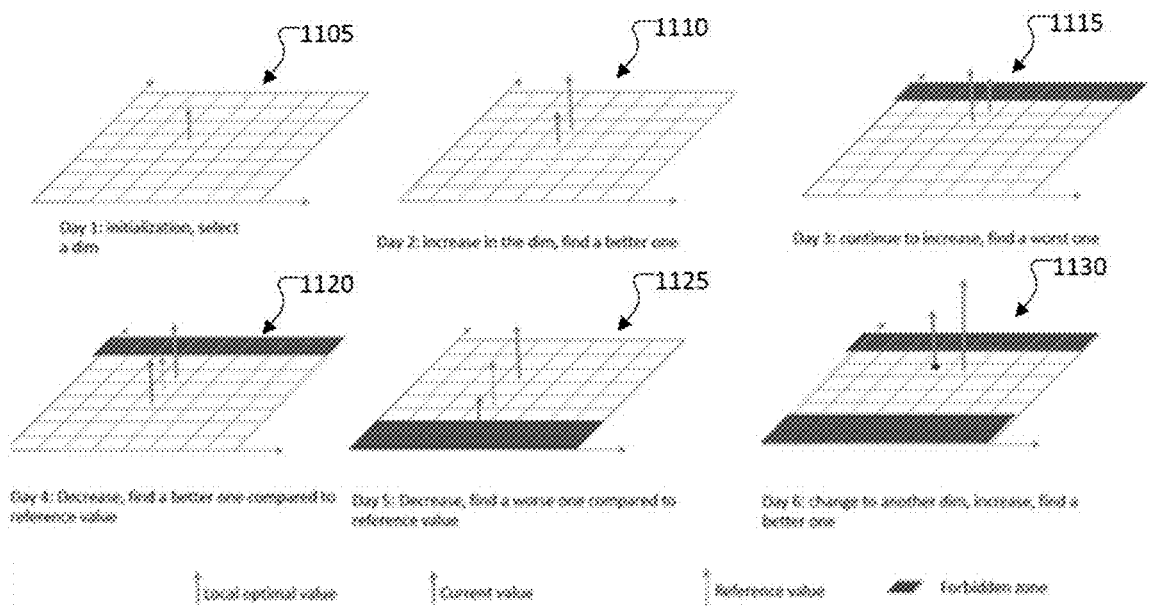
FIGS. 11 and 12 illustrate an example beam searching procedure according to embodiments of the present disclosure.
Figure 12:
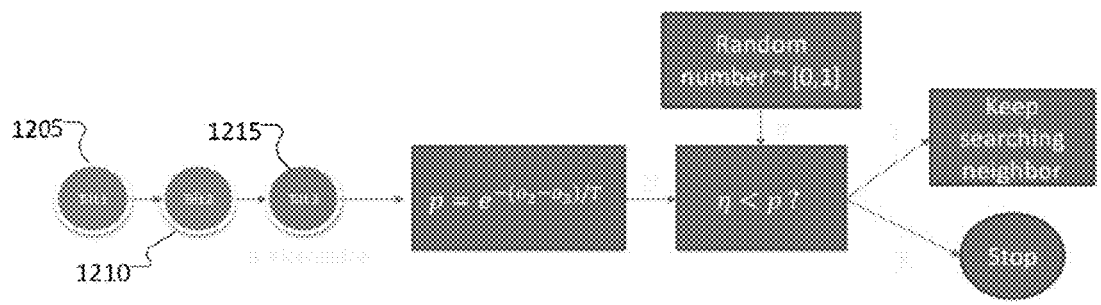

FIGS. 11 and 12 illustrate an example beam searching procedure according to embodiments of the present disclosure. The embodiments of the beam searching method shown in FIGS. 11 and 12 are for illustration only and other embodiments could be used without departing from the scope of the present disclosure.

In certain embodiments, the beam searching procedure is greedy based. After obtaining the objective function, the KPI's are fetched and the objection function is calculated.

Then, a new common beam is selected and the objective function is calculated again. Commons beam feature includes three dimensions, horizontal beam width, vertical beam width, and E-tilt. In certain embodiments, the search will start from one dimension, such as horizontal beam width 1105. During searching along one dimension, the horizontal beam width is increased. If the current objective increases 1110 in the dimension (dim), then it is determined that the previous search direction is good. As an increase in horizontal beam width is again introduced, a decrease in the current objective 1115 indicates that the previous search direction is poor and a new search direction is required. That is, if the objective function drops, the horizontal beam width is decreased. If the objective function increases with respect to a reference value 1120, then the search direction is deemed good. If the objective function drops again 1125 when the horizontal beam width is again decreased, another dimension is selected for the search 1130. For example, the system can switch to adjusting vertical beam width or adjusting E-Tilt as shown in FIG. 12 in which a first tilt, Tilt 1 1205, is selected. If the objective function increases, the E-tilt is increased to a second tilt, Tilt 2 1210. If the objective function decreases, the E-tilt is reduced to a third Tilt, Tilt 3 1215, and so forth, until a desired objective function is obtained.

Figure 13:
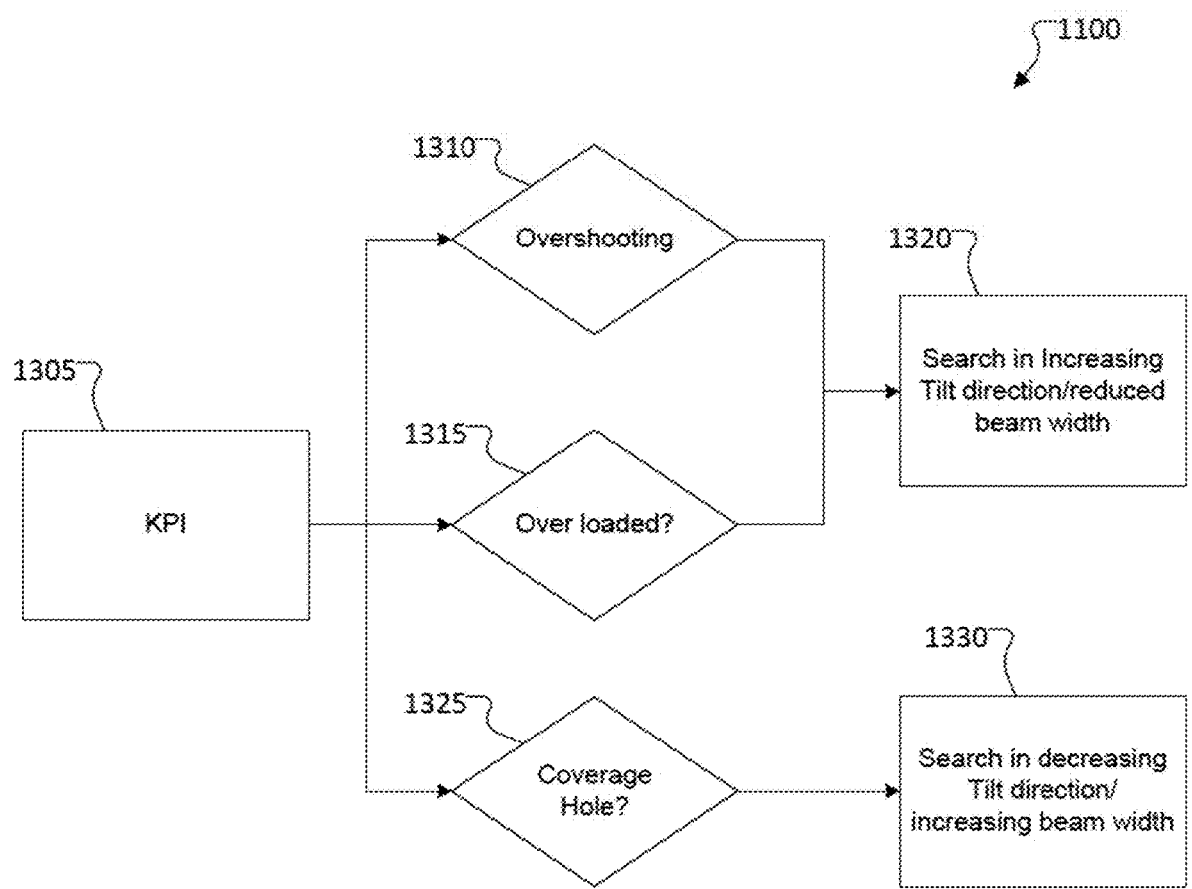
FIG. 13 illustrates another beam searching procedure according to embodiments of the present disclosure.

FIG. 13 illustrates another beam searching procedure according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a gNB. Process 1300 can be accomplished by, for example, gNB 102, and gNB 103 in network 100.

In certain embodiments, the beam searching procedure is based on a rule-based method. At operation 1305, gNB 102 obtains one or more KPI values such as included in a measurement report from UE's in its respective cells. For example, UE 116 is configured to measure SINR and the like. At operation 1310, gNB 102 determines that the signal is overshooting the target cell. Additionally or alternatively, at operation 1315, gNB 102 102 determines that the target cell is overloaded. Based on a determination that the cell is being overshot in operation 1310 or overloaded in 1315, gNB 102 begins to search by increasing E-Tilt direction or reducing horizontal or vertical beam width in operation 1320. In operation 1325, gNB 102 determines whether a coverage hole exists within the target cell. If a coverage hole exists, gNB 102 begins to search by decreasing E-Tilt direction or increasing horizontal or vertical beam width in operation 1330.

Figure 14:
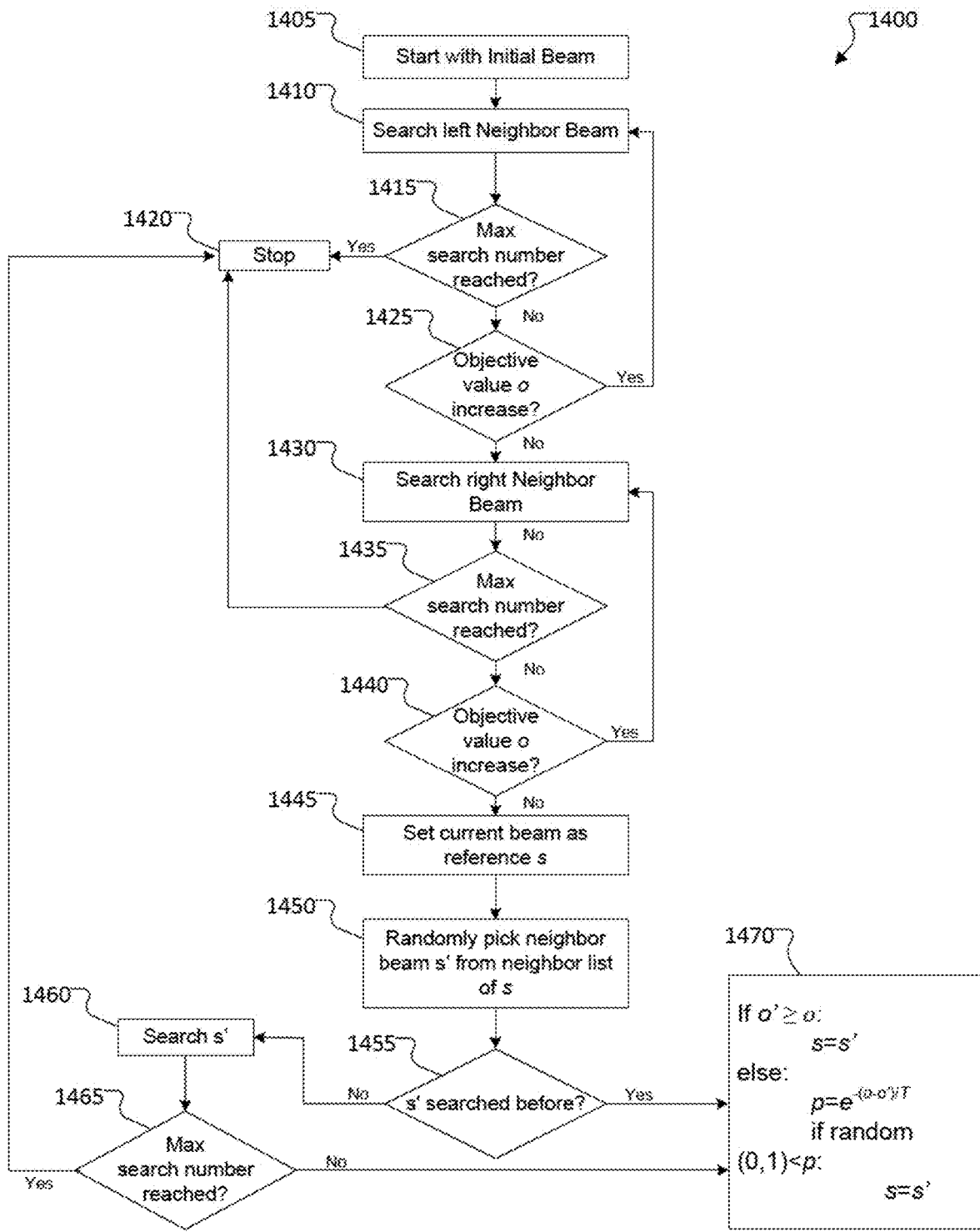
FIG. 14 illustrates a beam searching method according to embodiments of the present disclosure.

FIG. 14 illustrates a beam searching method according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a gNB. Process 1300 can be accomplished by, for example, gNB 102, and gNB 103 in network 100.

At operation 1405, gNB 012 starts within an initial beam. At operation 1410, after fetching the KPI, gNB 012 checks the left neighbor beam. The left neighbor beam can be defined as the beam that is different by one value in the vertical domain, horizontal domain, or in the E-tilt domain. That is, the beams are designed with a structure and the beams are different in horizontal beam widths, vertical beam widths, or having a different tilt. For example, the left neighbor beam can be the first beam that is left in tilt from the initial beam. Alternatively, the left neighbor beam can be the first beam that is offset in a first direction from the initial beam horizontal width in horizontal beam width dimension, or that is that is offset in a first direction from the initial beam vertical width in vertical beam width dimension. The search commences by increasing E-tilt or reduction in horizontal or vertical beam width. Alternatively, the search can begin by decreasing tilt and increasing the respective beam width.

At operation 1415, gNB 102 determines if a maximum number of searches has occurred in the left neighbor beam dimensional direction. If the maximum number of searches has occurred, the process is stopped at operation 1420. If the maximum number of searches has not been reached, gNB 102 determines whether the objective value o increases in operation 1425. If the objective value o increases, gNB 102 returns to operation 1410 and again searches the next left neighbor beam, such as by respectively increasing tilt, or reducing horizontal or vertical beam width. If the objective value o decreases, gNB 102 searches the right neighbor beam in operation 1430. The right neighbor beam can be the first beam that is right (opposite from left) in tilt from the previous beam. Alternatively, the right neighbor beam can be the first beam that is offset in a second direction (different from the first direction) from the current beam horizontal width in horizontal beam width dimension, or that is that is offset in a second direction (different from the first direction) from the current beam vertical width in vertical beam width dimension.

At operation 1435, gNB 102 determines if a maximum number of searches has occurred in the right neighbor beam dimensional direction. If the maximum number of searches has occurred, the process is stopped at operation 1420. If the maximum number of searches has not been reached, gNB 102 determines whether the objective value o increases in operation 1440. If the objective value o increases, gNB 102 returns to operation 1430 and again searches the next right neighbor beam, such as by respectively decreasing tilt, or increasing horizontal or vertical beam width.

In certain embodiments, randomness is introduced. If the objective value o decreases, gNB 102 sets the current be as reference "s" in operation 1445. In operation 1450, gNB 102 randomly picks a neighbor beam s' from the neighbor list of the reference beam s. For example, the neighbor beam can be selected based on a similarity between two beams and a randomness of selecting the neighbor beam can be based on a distance between two beams. In operation 1455, gNB 102 determines whether the selected beam, s', has been searched before. If gNB 102 determines that s' has not been searched previously, gNB 102 proceeds to search s' in operation 1460, such as by evaluating the objective value. In operation 1465, gNB 102 determines with the maximum number of searches has been performed. If the maximum number of searches has been reached, the process is stopped at operation 1420. Alternatively, if the maximum number of searches has not been reached, gNB 102 evaluates the current objective value o' for s' against the previous objective value for the reference s in operation 1470. Additionally, when gNB 102 determines that s' has been previously searched in operation 1455, gNB 102 proceeds to evaluate the objective values in operation 1470. In operation 1470, gNB 102 determines whether the objective value o' for s' is greater than or equal to the objective value o for s. If o'>o, then gNB 102 sets new beam s' as the current reference beam s. Alternatively, if o'<o, then gNB 102 calculates:

$$p = e^{-(o-o')/T} \qquad (8)$$

If random (0,1)<p, then gNB 102 sets new beam s' as the current reference beam s.

Figure 15:
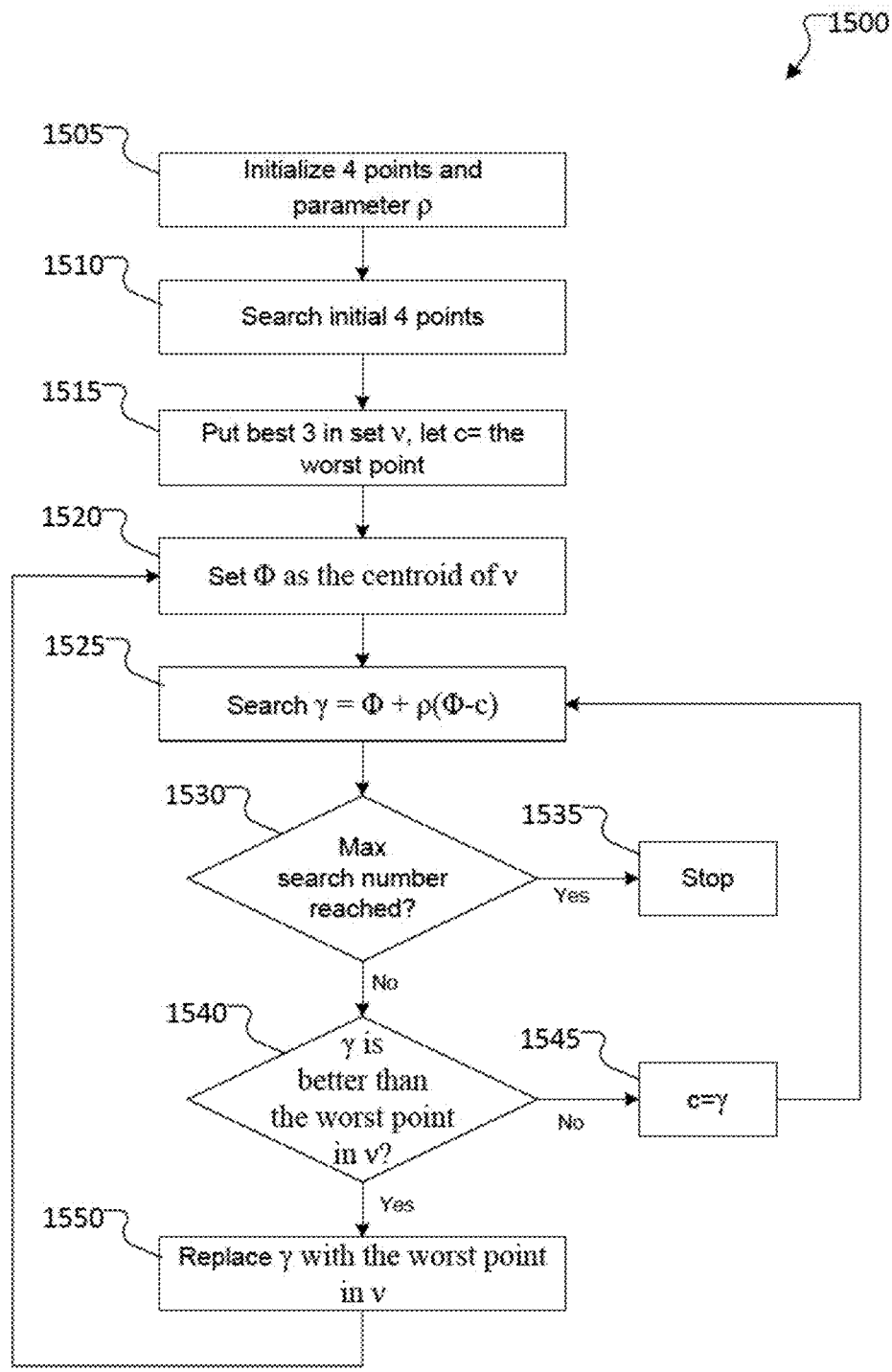
FIG. 15 illustrates a process for A2 and A5 optimization according to embodiments of the present disclosure.

FIG. 15 illustrates a process for A2 and A5 optimization according to embodiments of the present disclosure. The embodiment of the A2 and A5 optimization shown in FIG. 15 is for illustration only. Other embodiments could be used without departing from the scope of the present disclosure.

In certain embodiments, the base station is configured to use multi-shot optimization to optimize the A2 A5 threshold. In A2 A5 optimization, there are three dimension of optimization, A2 threshold, A5 high threshold, and A5 low threshold. One of the objective functions is to reduce the connection outage probability:

$$\max_\theta f(\theta) \qquad (9)$$

$$\text{s.t.} \quad \theta_1 \geq \theta_2 \qquad (10)$$

$$f(\theta) = 1 - \mathbb{E}\left(\frac{\sum_{i=1}^{N} I_{R_i(\theta) < \overline{R}}}{N}\right) \qquad (11)$$

$$I_{R_i(\theta) < \overline{R}} = \begin{cases} 1, & R_i(\theta) < \overline{R} \\ 0, & \text{otherwise} \end{cases} \qquad (12)$$

where $\theta = [A2, A5_1, A5_2]$, $R_i(\theta)$ is the throughput for the $i^{th}$ UE.

In operation 1505, a range of four points are selected along with a parameter p. In operation 1510, the initial four points are searched. In operation 1515, the best three points are selected and placed in set v, with the worst point being denoted as c. In operation 1520, the centroid Φ of set v is calculated. In operation 1525, based on the centroid Φ and a function of the worst point c, a new point γ is calculated. In operation 1530, it is determined whether the maximum number of searches has been performed. If the maximum number of searches has been reached, the process is stopped at operation 1535. Alternatively, if the maximum number of searches has not been reached, it is determined whether γ is a better than the worst point in set v in operation 1540. If γ is not better than the worst point set v, the γ is set to be the worst point, i.e., c=γ in operation 1545. Alternatively, if γ is a better than the worst point set v, then γ replaces the worst point in set v in operation 1550 and the process returns to operation 1520 to again calculate the centroid Φ of set v.

FIGS. 16A-16E illustrate a parameter searching sequence according to embodiments of the present disclosure. The embodiment of the parameter searching sequence shown in FIGS. 16A-16E is for illustration only. Other embodiments could be used without departing from the scope of the present disclosure.

In certain embodiments, before the searching starts, a searching range is introduced where the searching will be within the searching range. The searching range will be defined by eight points in the 3-dimensional searching space.

Figure 16A:
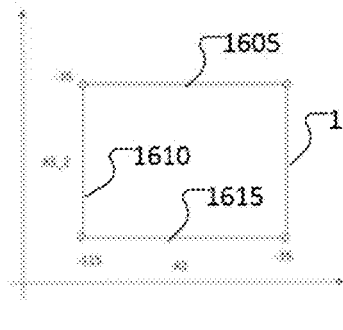
FIGS. 16A-16E illustrate a parameter searching sequence according to embodiments of the present disclosure.
Figure 16B:
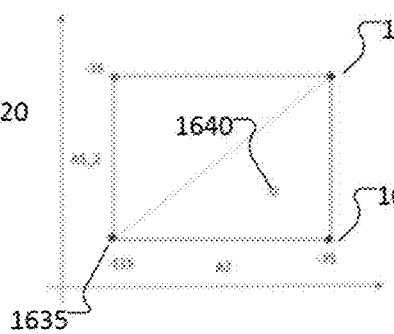
Figure 16C:
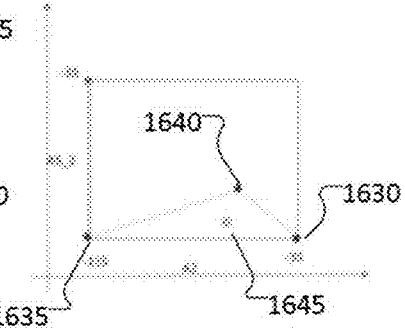

In certain embodiments, the parameter searching sequence comprises an Intro-Simplex process as depicted in FIGS. 16A-16C. For example, first four boundaries 1605a, 1610, 1615, 1620 are searched along A2 and A5 to select a best 3 points 1625, 1630, 1635. Then, a search for the centroid 1640 of the triangle formed by points 1625, 1630, 1635 is performed. The best three points 1630, 1635, 1640 are then selected from among the points 1625, 1630, 1635, 1640. Thereafter, another search for the centroid 1645 of the triangle formed by points 1630, 1635, 1640 is performed. Again, the best three points are then selected from among the points 1630, 1635, 1640, 1645. Details on the searching method for Intro-Simplex is summarized in the following Algorithm 1 in Table 1:

TABLE 1

Into-Simplex Algorithm

Figure 16D:
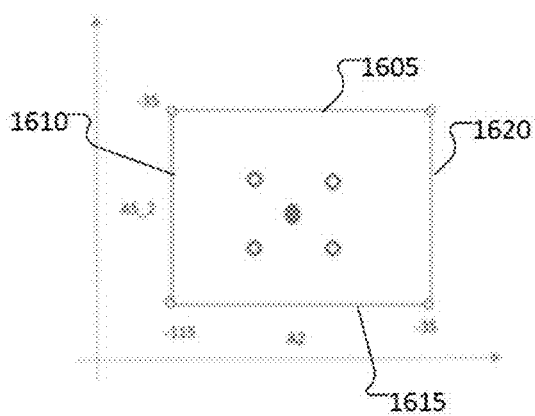
Figure 16E:
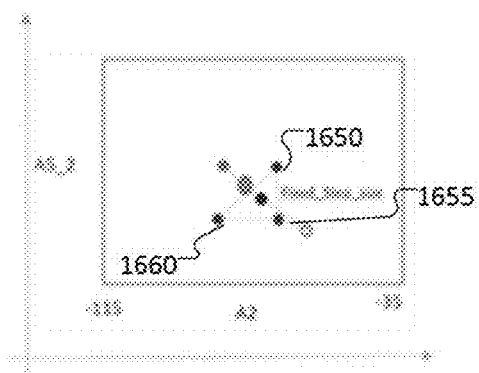

Result: θ
Initialization: $\theta_1, ..., \theta_{N+1}$ and parameter ρ;
Obtain $f(\theta_1), ..., f(\theta_{N+1})$;
Get sorted $\theta_1, ..., \theta_{N+1}$, where $f(\theta_1) < ... < f(\theta_{N+1})$;
Set $c = \theta_1$;
Set $v = \{\theta_2, ..., \theta_{N+1}\}$;
While Reach Max Iterations or $\|c - \gamma\| = 0$ do
  |Set φ as the centroid of v;
  | Obtain f(γ), where $\gamma = c + \rho(\phi - c)$;
  | if $f(\gamma) > f(v_{(1)})$ then
  | |v > $v_{(-1)} \cup_\gamma$, where $v_{(-1)}$ is set without the lowest sorted parameter;
  | else
  | |c = γ;
  | end
end In certain embodiments, the parameter searching sequence comprises an Extro-Simplex process as depicted in FIGS. 16D-16E. For example, first four boundaries 1605a, 1610, 1615, 1620 are searched along A2 and A5 to select a best 3 points 1650, 1655, 1660. Then, a search along the direction defined by the centroid 1640 of the triangle, formed by points 1650, 1655, 1660, and the worst vertex performed. Details on the searching method for Intro-Simplex is summarized in the following Algorithm 2 in Table 2:

TABLE 2

Extro-Simplex Algorithm

Result: θ
Initialization: $\theta_1, ..., \theta_{N+1}$ and parameter ρ;
Obtain $f(\theta_1), ..., f(\theta_{N+1})$;
Get sorted $\theta_1, ..., \theta_{N+1}$, where $f(\theta_1) < ... < f(\theta_{N+1})$;
Set $c = \theta_1$;
Set $v = \{\theta_2, ..., \theta_{N+1}\}$;
While Reach Max Iterations or $\|c - \gamma\| = 0$ do
  |Set φ as the centroid of v;
  | Obtain f(γ), where $\gamma = \phi + \rho(\phi - c)$;
  | if $f(\gamma) > f(v_{(1)})$ then
  | |v > $v_{(-1)} \cup_\gamma$, where $v_{(-1)}$ is set without the lowest sorted parameter;
  | else
  | |c = γ;
  | end
end The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A method comprising:
generating one or more specified Key Performance Indicators (KPI) constraints based on a selected set of KPIs;
adjusting common beam parameters to tune a common beam based on the selected set of KPIs, wherein the common beam is tuned to satisfy the one or more specified KPI constraints;
adjusting handover A2 and A5 parameters based on searching within a three-dimensional space defined by specified A2 and A5 thresholds; and
transmitting one or more signals based on the adjusted the common beam parameters and the adjusted handover A2 and A5 parameters.

2. The method of claim 1, wherein the common beam parameters are adjusted by varying at least one of three dimensional settings, the three dimensional settings comprising a horizontal beam width, a vertical beam width, and an antenna tilt.

3. The method of claim 2, wherein adjusting the common beam parameters comprises:
selecting a first antenna setting corresponding to a first dimension of a beam structure;
at least one of increasing or decreasing the first antenna setting; and
determining whether the one or more specified KPI constraints has been satisfied.

4. The method of claim 3, wherein adjusting the common beam parameters comprises:
after specified number of iterations for increasing or decreasing the first antenna setting, selecting a second antenna setting corresponding to a second dimension of the beam structure when the first dimension experiences a loss of performance;
at least one of increasing or decreasing the second antenna setting; and
determining whether the one or more specified KPI constraints has been satisfied.

5. The method of claim 1, wherein adjusting the common beam parameters comprises:
randomly selecting a neighbor beam from a neighbor list of a reference beam, wherein the neighbor beam is selected based on a similarity between two beams and a randomness of selecting the neighbor beam is based on a distance between two beams; and
determining whether the selected neighbor beam satisfies the one or more specified KPI constraints.

6. The method of claim 1, wherein adjusting the handover A2 and A5 parameters comprises:
configuring a network to work under four boundary points of the handover A2 and A5 parameters;
collecting one or more network performance indicators while under the four boundary points;
selecting a first set of at least three best points in terms of performance within the four boundary points included in the three-dimensional space defined by the specified A2 and A5 thresholds; and
calculating a centroid of the first set of at least three best points.

7. The method of claim 6, wherein adjusting the handover A2 and A5 parameters further comprises at least one of:
configuring the network to work under the calculated centroid;
collecting the one or more network performance indicators under the calculated centroid;
selecting a second set of the best three points out of the previously selected first set of at least three best points and the calculated centroid;
calculating at least one of:
a second centroid of the second set of the best three points; or
a new point based on the calculated centroid and a worst vertex of the previously selected at least three best points; and
configuring the network to work under the second centroid or the new point.

8. An apparatus comprising:
a transceiver configured to communicate via a wireless communication medium; and
a processor configured to:
generate one or more specified Key Performance Indicators (KPI) constraints based on a selected set of KPIs;
adjust common beam parameters to tune a common beam based on the selected set of KPIs, wherein the common beam is tuned to satisfy the one or more specified KPI constraints;
adjust handover A2 and A5 parameters based on searching within a three-dimensional space defined by specified A2 and A5 thresholds; and
transmit one or more signals based on the adjusted the common beam parameters and the adjusted handover A2 and A5 parameters.

9. The apparatus of claim 8, wherein the processor is configured to adjust the common beam parameters by varying at least one of three dimensional settings, the three dimensional settings comprising a horizontal beam width, a vertical beam width, and an antenna tilt.

10. The apparatus of claim 9, wherein the processor is configured to adjust the common beam parameters by:
selecting a first antenna setting corresponding to a first dimension of a beam structure;
at least one of increasing or decreasing the first antenna setting; and
determining whether the one or more specified KPI constraints has been satisfied.

11. The apparatus of claim 10, wherein the processor is configured to adjust the common beam parameters by:
after specified number of iterations for increasing or decreasing the first antenna setting, selecting a second antenna setting corresponding to a second dimension of the beam structure when the first dimension experiences a loss of performance;
at least one of increasing or decreasing the second antenna setting; and
determining whether the one or more specified KPI constraints has been satisfied.

12. The apparatus of claim 8, wherein the processor is configured to adjust the common beam parameters by:
randomly selecting a neighbor beam from a neighbor list of a reference beam, wherein the neighbor beam is selected based on a similarity between two beams and a randomness of selecting the neighbor beam is based on a distance between two beams; and
determining whether the selected neighbor beam satisfies the one or more specified KPI constraints.

13. The apparatus of claim 8, wherein the processor is configured to adjust the handover A2 and A5 parameters by:
- configuring a network to work under four boundary points of the handover A2 and A5 parameters;
- collecting one or more network performance indicators while under the four boundary points;
- selecting a first set of at least three best points in terms of performance within the four boundary points included in the three-dimensional space defined by the specified A2 and A5 thresholds; and
- calculating a centroid of the first set of at least three best points.

14. The apparatus of claim 13, wherein the processor is configured to adjust the handover A2 and A5 parameters by at least one of:
- configuring the network to work under the calculated centroid;
- collecting the one or more network performance indicators under the calculated centroid;
- selecting a second set of the best three points out of the previously selected first set of at least three best points and the calculated centroid;
- calculating at least one of:
  - a second centroid of the second set of the best three points; or
  - a new point based on the calculated centroid and a worst vertex of the previously selected at least three best points; and
- configuring the network to work under the second centroid or the new point.

15. A non-transitory computer readable medium comprising a plurality of instructions that, when executed by a processor, cause the processor to:
- generate one or more specified Key Performance Indicators (KPI) constraints based on a selected set of KPIs;
- adjust common beam parameters to tune a common beam based on the selected set of KPIs, wherein the common beam is tuned to satisfy the one or more specified KPI constraints;
- adjust handover A2 and A5 parameters based on searching within a three-dimensional space defined by specified A2 and A5 thresholds; and
- transmit one or more signals based on the adjusted the common beam parameters and the adjusted handover A2 and A5 parameters.

16. The non-transitory computer readable medium of claim 15, wherein the instructions are further configured to cause the processor to adjust the common beam parameters by varying at least one of three dimensional settings, the three dimensional settings comprising a horizontal beam width, a vertical beam width, and an antenna tilt.

17. The non-transitory computer readable medium of claim 16, wherein the instructions are further configured to cause the processor to adjust the common beam parameters by:
- selecting a first antenna setting corresponding to a first dimension of a beam structure;
- at least one of increasing or decreasing the first antenna setting; and
- determining whether the one or more specified KPI constraints has been satisfied.

18. The non-transitory computer readable medium of claim 17, wherein the instructions are further configured to cause the processor to adjust the common beam parameters by:
- after specified number of iterations for increasing or decreasing the first antenna setting, selecting a second antenna setting corresponding to a second dimension of the beam structure when the first dimension experiences a loss of performance;
- at least one of increasing or decreasing the second antenna setting; and
- determining whether the one or more specified KPI constraints has been satisfied.

19. The non-transitory computer readable medium of claim 15, wherein the instructions are further configured to cause the processor to adjust the common beam parameters by:
- randomly selecting a neighbor beam from a neighbor list of a reference beam, wherein the neighbor beam is selected based on a similarity between two beams and a randomness of selecting the neighbor beam is based on a distance between two beams; and
- determining whether the selected neighbor beam satisfies the one or more specified KPI constraints.

20. The non-transitory computer readable medium of claim 15, wherein the instructions are further configured to cause the processor to adjust the handover A2 and A5 parameters by:
- configuring a network to work under four boundary points of the handover A2 and A5 parameters;
- collecting one or more network performance indicators while under the four boundary points;
- selecting a first set of at least three best points in terms of performance within the four boundary points included in the three-dimensional space defined by the specified A2 and A5 thresholds;
- calculating a centroid of the first set of at least three best points;
- configuring the network to work under the calculated centroid;
- collecting the one or more network performance indicators under the calculated centroid;
- selecting a set of the second best three points out of the previously selected first set of at least three best points and the calculated centroid;
- calculating at least one of:
  - a second centroid of the second set of the best three points; or
  - a new point based on the calculated centroid and a worst vertex of the previously selected at least three best points; and
- configuring the network to work under the second centroid or the new point.

* * * * *